(12) United States Patent
Urzainki Beristain et al.

(10) Patent No.: US 10,980,619 B2
(45) Date of Patent: Apr. 20, 2021

(54) METHOD FOR MANUFACTURING AND MACHINING DENTAL, MAXILLOFACIAL AND TRAUMA PROSTHESES

(71) Applicant: Createch Medical, S.L., Mendaro (ES)

(72) Inventors: Rubén Urzainki Beristain, Mendaro (ES); Antxoka Urzainki Beristain, Mendaro (ES); Mikel Gómez Picaza, Mendaro (ES); Julen Gimeno Eguia, Mendaro (ES); Arkaitz Ortega Trucios, Mendaro (ES)

(73) Assignee: Createch Medical, S.L., Mendaro (ES)

( * ) Notice: Subject to any disclaimer, the term of this patent is extended or adjusted under 35 U.S.C. 154(b) by 300 days.

(21) Appl. No.: 16/021,345

(22) Filed: Jun. 28, 2018

(65) Prior Publication Data

US 2019/0021825 A1 Jan. 24, 2019

(30) Foreign Application Priority Data

Jul. 24, 2017 (ES) .................................. P201730962

(51) Int. Cl.
*A61C 13/00* (2006.01)
*B33Y 10/00* (2015.01)
(Continued)

(52) U.S. Cl.
CPC ...... *A61C 13/0004* (2013.01); *A61C 13/0013* (2013.01); *A61C 13/0022* (2013.01);
(Continued)

(58) Field of Classification Search
CPC ............ A61C 13/0004; A61C 13/0013; A61C 13/0022; A61C 8/0048; A61C 13/12;
(Continued)

(56) References Cited

U.S. PATENT DOCUMENTS

2015/0093720 A1\* 4/2015 Beeby ................ A61C 13/0013
433/202.1

FOREIGN PATENT DOCUMENTS

EP 0565174 B1 11/1998
EP 1997453 A2 12/2008
(Continued)

*Primary Examiner* — John C Hong
(74) *Attorney, Agent, or Firm* — The Webb Law Firm (57) ABSTRACT

A method for manufacturing and machining dental, maxillofacial and trauma prostheses and for optimizing an amount of time used in machining a prosthesis that has been previously manufactured with additive manufacturing technology is provided. The method includes manufacturing, by using excess material and additive manufacturing technology on a printing plate, a prosthetic block including at least a prosthesis. The method further includes joining pieces and positioning elements with specific dimensions and distances between the same; positioning the prosthetic block on a machining tray using the positioning elements; fixing the prosthetic block to the machining tray using the positioning elements; and fixing the machining tray to a machining machine, such that the prosthesis is fixed in a specific and known position in the machining machine by the specific dimensions and distances of the prosthetic block. The method further includes performing a machining operation to critical areas of the prosthesis.

12 Claims, 7 Drawing Sheets

(51) Int. Cl.
*B33Y 30/00* (2015.01)
*A61C 8/00* (2006.01)
*B33Y 80/00* (2015.01)
*A61C 13/12* (2006.01)
*A61C 5/77* (2017.01)
*B29C 64/40* (2017.01)

(52) U.S. Cl.
CPC ............... *B33Y 10/00* (2014.12); *B33Y 30/00* (2014.12); *A61C 5/77* (2017.02); *A61C 8/0048* (2013.01); *A61C 13/0006* (2013.01); *A61C 13/12* (2013.01); *B29C 64/40* (2017.08); *B33Y 80/00* (2014.12)

(58) Field of Classification Search
CPC ....... A61C 5/77; A61C 13/0006; A61C 13/00; B33Y 10/00; B33Y 30/00; B33Y 80/00; B29C 64/40
See application file for complete search history.

(56) References Cited

FOREIGN PATENT DOCUMENTS

| | | | |
|---|---|---|---|
| EP | 3095538 A1 * | 11/2016 | ........... B29C 64/153 |
| ES | 2126623 T3 | 4/1999 | |
| ES | 2282037 A1 | 10/2007 | |
| ES | 2588604 T3 | 11/2016 | |
| WO | 2006005284 A3 | 6/2006 | |
| WO | 2014094966 A1 | 6/2014 | |

* cited by examiner

METHOD FOR MANUFACTURING AND MACHINING DENTAL, MAXILLOFACIAL AND TRAUMA PROSTHESES

CROSS-REFERENCE TO RELATED APPLICATION

This application claims priority to Spanish Patent Application No. P201730962 filed Jul. 24, 2017, the disclosure of which is hereby incorporated in its entirety by reference.

OBJECT OF THE INVENTION

The present invention relates to a method for manufacturing and machining dental, maxillofacial and trauma prostheses using the additive manufacturing technology and optimizing the amount of time used in machining a prosthesis that has been previously manufactured with additive manufacturing technology.

BACKGROUND OF THE INVENTION

Additive manufacturing of any element with 3D printers, the technology of which is based on the technology of additive manufacturing, wherein a layer is superimposed over another to form complex shapes, is now used for manufacturing different products from diverse sectors, due to the simplicity involved in using said technology and to the fact that a large number of people now have access to said printers, since, among other reasons, the costs associated with acquiring the same have been reduced.

One of the many products being manufactured by additive manufacturing technology or 3D printing are prostheses for the human body, and more specifically, and related to the present invention, dental prostheses.

Manufacturing dental prostheses by means of 3D printing requires a subsequent processing of the manufactured prosthesis, which implies a machining process of the piece, both to eliminate irregularities of the piece caused by the 3D printing, as well as to provide a high quality surface finish to the piece, which 3D printing is not able to provide on its own.

The subsequent machining process is done in a machining machine that carries out the process in an automatic and guided way. In order to perform the machining process, it is necessary to fix the manufactured prosthesis to the base plate of the machining machine, this operation of fixing the prosthesis implying a loss of time, or an unproductive time, which is generally quite a high amount of time in relation to the result of the operation, in other words, obtaining a prosthesis.

DESCRIPTION OF THE INVENTION

The disclosure concerns a method for manufacturing and machining dental, maxillofacial and trauma prostheses and comprises the following steps:

manufacturing by using excess material and additive manufacturing technology on a printing plate, a prosthetic block, which comprises at least a prosthesis, a plurality of joining pieces and at least a positioning element, with specific dimensions and distances between the prosthesis, joining pieces and positioning elements;

positioning the prosthetic block on a machining tray by means of the positioning elements;

fixing the prosthetic block to the machining tray by means of at least the positioning elements, such that the prosthesis is fixed in a specific and known position on the machining tray, thanks to the specific distances and dimensions of the prosthetic block;

fixing the machining tray to a machining machine, performing a machining operation to the critical areas of the prosthesis to provide dimensional and surface finish characteristics to said critical areas of the prosthesis.

In an embodiment of the method for manufacturing and machining dental, maxillofacial and trauma prostheses, object of the invention, after manufacturing and before positioning the prosthetic block on the machining tray, the method comprises the additional steps of:

releasing the prosthetic block from the printing plate, and applying a stabilizing treatment to the material.

In another embodiment of the method for manufacturing and machining dental, maxillofacial and trauma prostheses, object of the invention, after the manufacturing, the method comprises the steps of:

applying a stabilizing treatment to the material, performing a prior machining of the surface of the prosthetic block to improve the surface and dimensional quality of the manufactured prosthesis, and likewise, machining the positioning elements with regard to their vertical dimension and width, and releasing the prosthetic block from the printing plate.

In this embodiment, the step of positioning the prosthetic block on the machining tray by means of the positioning elements comprises a substep consisting of rotating the prosthetic block 180° to then position it again on the machining tray.

The excess material with which the prosthetic block is manufactured by the method object of the invention is quantified between 5 and 1000 microns.

The stabilizing treatment to the material of the method object of the invention is a treatment selected from a thermal treatment (either applying heat or applying cold for metals), polymer curing (processes that may be thermal, chemical or consist of applying light, depending on the polymer), and ceramic sintering.

The thermal treatment using heat is done in a temperature range greater than 700 degrees centigrade. The thermal treatment using cold is done in a temperature range lower than zero degrees centigrade. The thermal treatment that alternates between heat and cold oscillates in a temperature range between −250 degrees centigrade and +1,000 degrees centigrade.

In the first embodiment of the method object of the invention, the positioning elements comprise a cylindrical body and a conical-shaped end, and the machining tray comprises a plurality of recesses located on vertices of a grid distributed on the machining tray that provide a series of references for the machining machine, such that the ends are positioned in the recesses so that the positioning of the prosthesis on the machining tray and subsequently in the machining machine is done with complete precision.

In the other embodiment of the method for manufacturing and machining dental, maxillofacial and trauma prostheses, object of the invention, the positioning elements are prismatic pieces that limit the dimensions of the prosthetic block to the machining tray.

In the two embodiments of the method for manufacturing and machining dental, maxillofacial and trauma prostheses, object of the invention, in the step of fixing the prosthetic block to the machining tray, an adhesive product is poured on the machining tray until a level is reached to create a compact block, fixing the entire volume of the prosthetic block to the machining tray.

There is another way to fix the prosthetic block to the machining tray, which consists of situating the adhesive product only between the positioning elements and the machining tray, only fixing the positioning elements to the machining tray.

BRIEF DESCRIPTION OF THE DRAWINGS

To complete the description and for the purpose of facilitating a better understanding of the features of the invention, this specification is accompanied by a set of drawings, as an integral part thereof, where by way of non-limiting example, the following has been represented.

Below is a list of the different elements shown in the figures that are included in the invention:
1. prosthesis,
2. printing plate,
3. positioning elements,
4. joining pieces,
5. prosthetic block,
6. positioning element body,
7. positioning element end,
8. machining tray,
9. references,
10. grid,
11. vertices of the grid,
12. recesses,
13. adhesive product,
14. additional tray,
100. manufacturing a prosthetic block by means of additive manufacturing technology,
101. releasing the prosthetic block from the printing plate,
102. applying a stabilizing treatment to the material,
103. positioning the prosthetic block on a machining tray,
104. fixing the prosthetic block to a machining tray,
105. fixing the prosthetic block and machining tray assembly to a base plate of a machining machine,
106. performing the machining process to the critical areas of the prosthesis, and
107. performing a prior machining.

PREFERRED EMBODIMENT OF THE INVENTION

The object of the present description is a method for manufacturing and machining dental, maxillofacial and trauma prostheses which for the manufacturing of the prosthesis (1) uses additive manufacturing technology, and thus the prosthesis (1) manufactured has excess material, which is subsequently removed by at least a machining process.

The method object of the invention improves current methods, since it optimizes the time of fixing the prosthetic block to the machining machine for performing the subsequent machining to the manufacture which is manufactured by means of additive manufacturing technology, and also ensures good quality of the manufactured prosthesis by performing the machining on a piece that has a previously known position and, therefore, said machining is easier.

Manufacturing by additive manufacturing technology allows prostheses to be manufactured in materials such as titanium, chromium, cobalt, peek, polyethylene, zirconium, or any other biocompatible metal, ceramic or polymeric materials.

Figure 1:
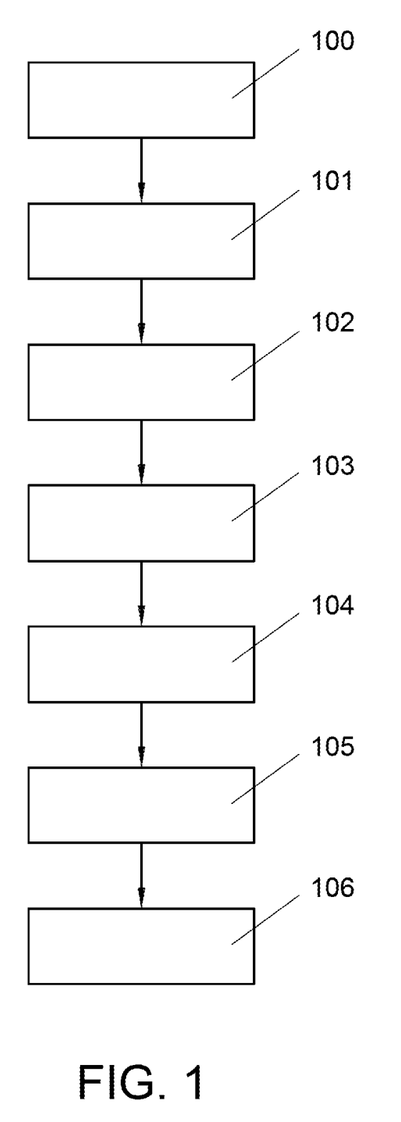
FIG. 1 shows a block diagram with the phases of the method according to the first embodiment of the method object of the invention.
Figure 3:
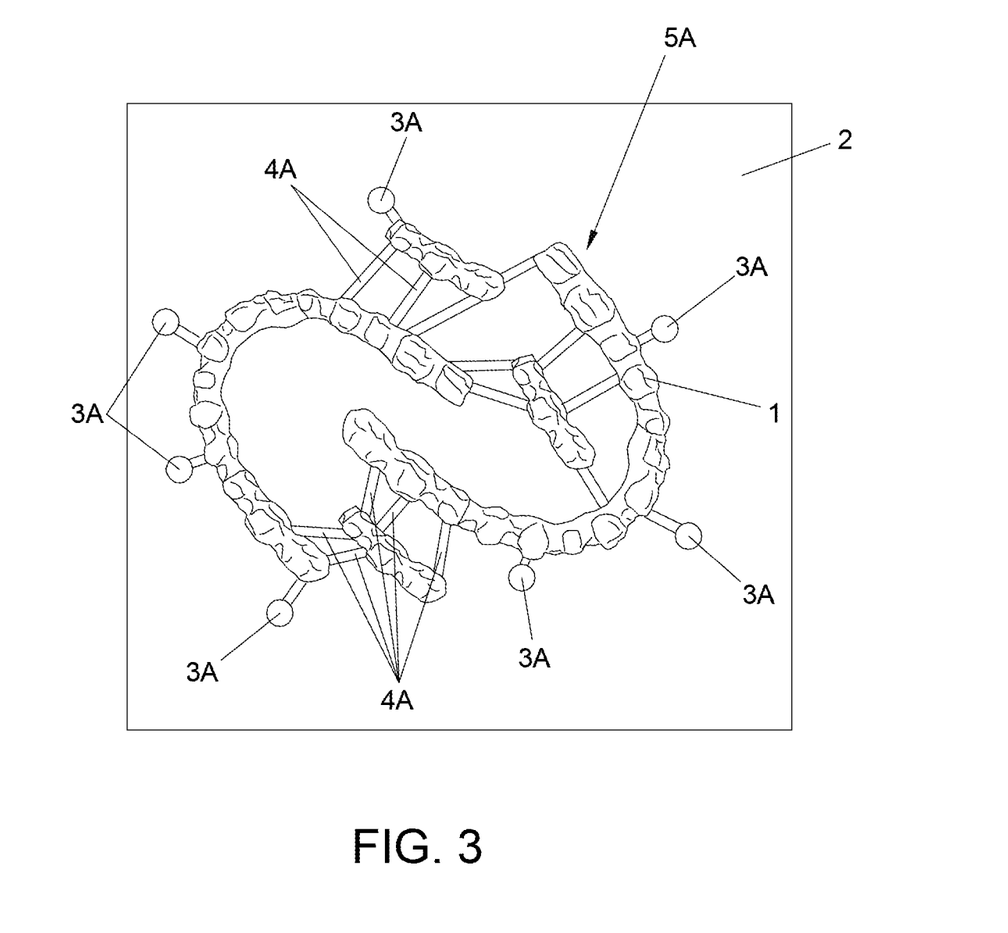
FIG. 3 shows a plan view of a prosthetic block on a printing plate with several prostheses joined to one another by means of joining pieces and, in turn, joined to the positioning elements according to the first embodiment of the method object of the invention.

The first embodiment of the method object of the invention begins with the step of manufacturing (100) a prosthetic block (5A) by means of additive manufacturing technology and with excess material, which is estimated to be between 5 and 1000 microns of material. In the manufacturing step (100), layers of material are superimposed on a printing plate (2). In the manufacturing step (100), at least two prostheses (1) are manufactured together with positioning elements (3A) to which the prostheses (1) are joined by means of joining pieces (4A) such that the prostheses (1), the joining pieces (4A) and the positioning elements (3A) form the prosthetic block (5A).

In this first embodiment, the positioning elements (3A) are pieces with a cylindrical body (6) that are situated as close as possible to the manufactured prosthesis (1), and which have conical-shaped ends (7).

In this first embodiment, after the step of manufacturing (100) a prosthetic block (5A), the prosthetic block (5A) is then released (101) from the printing plate (2) on which the manufacturing step (100) was performed, so that the prosthetic block (5A) releases stress created during the additive manufacturing process.

Then, in this first embodiment of the method object of the invention, the step of applying a stabilizing treatment to the material (102) is carried out which, depending on the material used in the manufacturing, is one type of treatment or another. As such, one may differentiate between:

thermal treatment: which can consist of applying heat in an oven or applying cold (cryogenics) for metals, such that the stresses created in the additive manufacturing method are eliminated.

polymer curing: the treatment varies depending on the polymer, thus, it can be a process that is, for example, thermal, chemical or consists in applying light.

ceramic sintering: consisting of applying heat for compacting the material.

The thermal treatment using heat is done in a temperature range greater than 700 degrees centigrade. The thermal treatment using cold or cryogenics is done within a temperature range below zero degrees centigrade, and the thermal treatment of heat and cold is done within a temperature range between −250 degrees centigrade and +1,000 degrees centigrade.

After applying the stabilizing treatment to the material (102), the first embodiment of the method object of the invention comprises the step of machining the critical areas of the prosthesis (106) to provide dimensional and surface finish characteristics to said critical areas of the prosthesis, which, by means of additive manufacturing technology is not possible to obtain. This machining is done on one face of the prosthetic block (5A) located farthest from the printing plate (2). The critical areas of the prosthesis (1) are areas of screw bases, implant connections, etc.

The machining of the critical areas of the prosthesis (106) is done by eliminating the excess material with which the prosthetic block (5A) is manufactured, and can be done by milling, truing, lathing, etc.

The machining is done in a machining machine, such that to be able to perform the machining to critical areas of the prosthesis (106), it is necessary to perform a prior step consisting of fixing the prosthetic block (5A) to a machining tray (104), once it has been released from the printing plate (2), and for the fixing thereof, positioning elements (3A) manufactured together with the prosthesis (1) are used, as will be shown later in this description.

Furthermore, to be able to fix the prosthetic block (5A) to the machining tray (104) it is necessary to perform a prior step, which consists of positioning the prosthetic block (5A) on the machining tray (103), which in this case provides a series of advantages for the method object of the invention with respect to that which is known in the state of the art.

Figure 4:
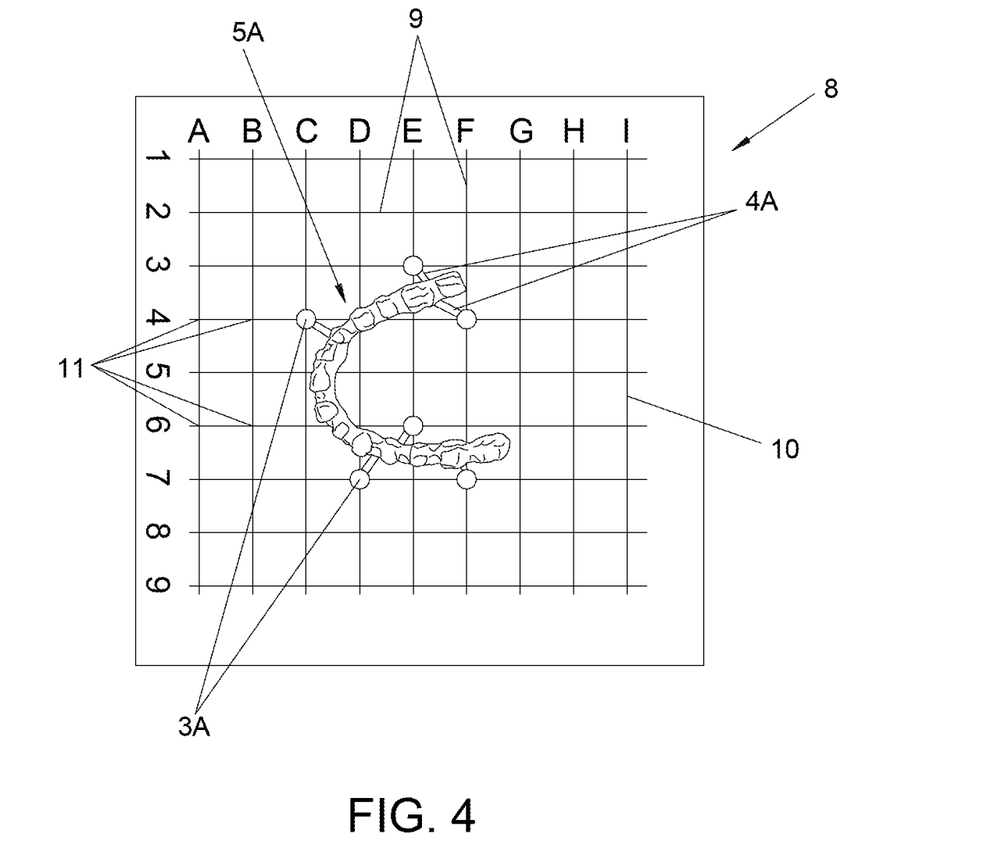
FIG. 4 shows the prosthesis positioned and fixed to the machining tray, showing the prosthesis positioned on the grid pattern by means of the positioning elements.

In a preferred embodiment, the references (9) of the machining tray (8) are formed by a grid (10) that divides the machining tray (8) into squares, the vertices (11) of which provide coordinates in the machining tray (8) itself (see FIG. 4).

In the preferred embodiment, the vertices of the grid (11) of the machining tray (8) house recesses (12) wherein, for positioning the prosthetic block (5A) (103), the ends (7) of the positioning elements (3A) of the prosthetic block (5A) are housed.

Figure 5A:
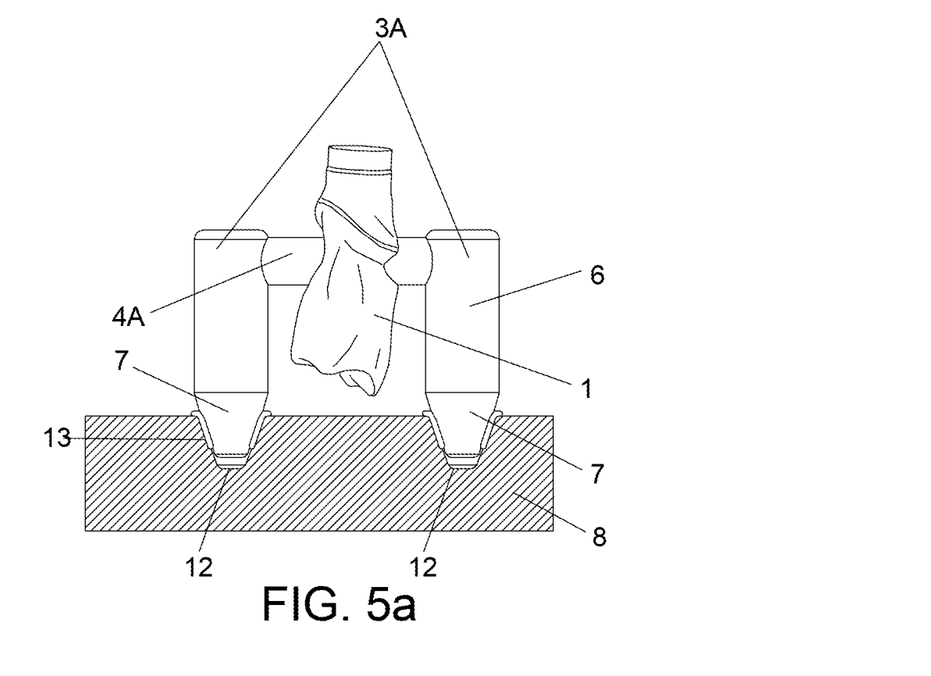
FIG. 5a shows a side view of the way of fixing the positioning elements to the machining tray according to a first way of fixing them in the first embodiment.
Figure 5B:
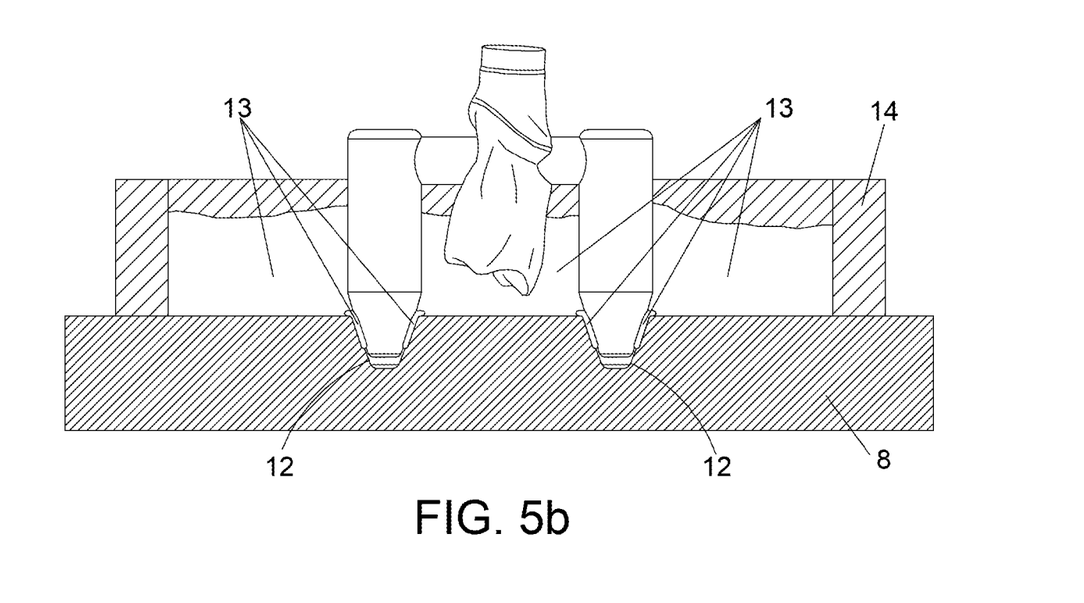
FIG. 5b shows a side view of the way in which the positioning elements are fixed to the machining tray according to a second way of fixing them in the first embodiment of the method object of the invention.

It is possible to perform the step of fixing the prosthetic block (5A) to the machining tray (8) (104) in two ways:

a first way, wherein the ends (7) of the positioning elements (3A) are exclusively fixed to the recesses (12) of the machining tray (8) by applying an adhesive product (13) to the contact area between the positioning elements (3A) and the recesses (12).

a second way, wherein the entire prosthetic block (5A) is joined to the machining tray (8), by applying an adhesive product (13) to the total volume of the prosthetic block (5A). This way of joining requires an additional tray (14) that limits the volume occupied by the adhesive product (13) around the prosthetic block (5A).

Once the prosthetic block (5A) has been fixed to the machining tray (8), in order to perform the machining to the critical areas of the prosthesis (106), it is necessary to fix the machining tray (8) to the base plate of the machining machine (105), which is done by conventional means.

The machining tray (8), on which the step of positioning (103) and subsequently the step of fixing (104) the prosthetic block (5A) is carried out, provides a series of references (9) for the machining machine, such that the prosthesis (1) manufactured together with the positioning elements (3A) (with known dimensions) and the references (9) of the machining tray (8) make it so positioning the prosthesis (1) in the machining machine is done with complete precision, and therefore the step of performing the machining on critical areas of the prosthesis (106) by the machining machine is done without error. In other words, the machining machine has exact coordinates to indicate where to perform the operation, which are obtained from the known dimensions of the prosthetic block (5A), (joint manufacturing of the prosthesis (1) together with the positioning elements (3A)), from the positioning of the prosthesis (1) by means of the positioning elements (3A) on the machining tray (8) using the references (9) of the machining tray (8) and the positioning of the machining tray (8) in the machining machine. Thus, when manufacturing the prosthetic block (5A) the method object of the invention takes into consideration the references (9) of the machining tray (8) where subsequently the aforementioned prosthetic block (5A) is positioned.

The first way to fix the prosthetic block (5A) to the machining tray (8) has the advantage in that, given that the prosthesis (1) does not make contact with the adhesive product (13), it is not necessary to subsequently clean the prosthesis (1). Furthermore, since a smaller amount of the adhesive product (13) is used, it is more economic than the second way of fixing the prosthetic block (5A) to the machining tray (8). However, the rigidity that this method of fixing provides is limited, and therefore, if the aforementioned rigidity is not sufficient for performing the machining, it is necessary to use the second fixing method.

Figure 2:
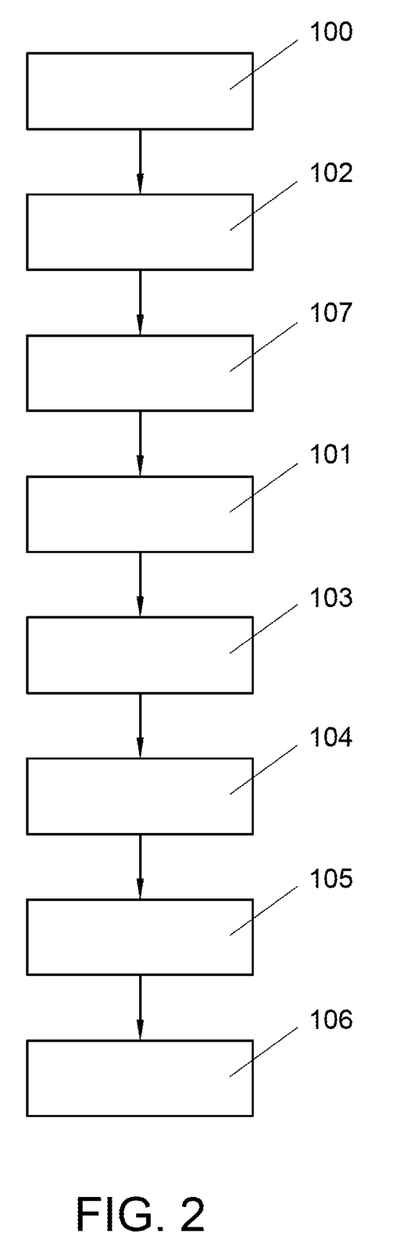
FIG. 2 shows a block diagram with the phases of the method according to the second embodiment of the method object of the invention.
Figure 6:
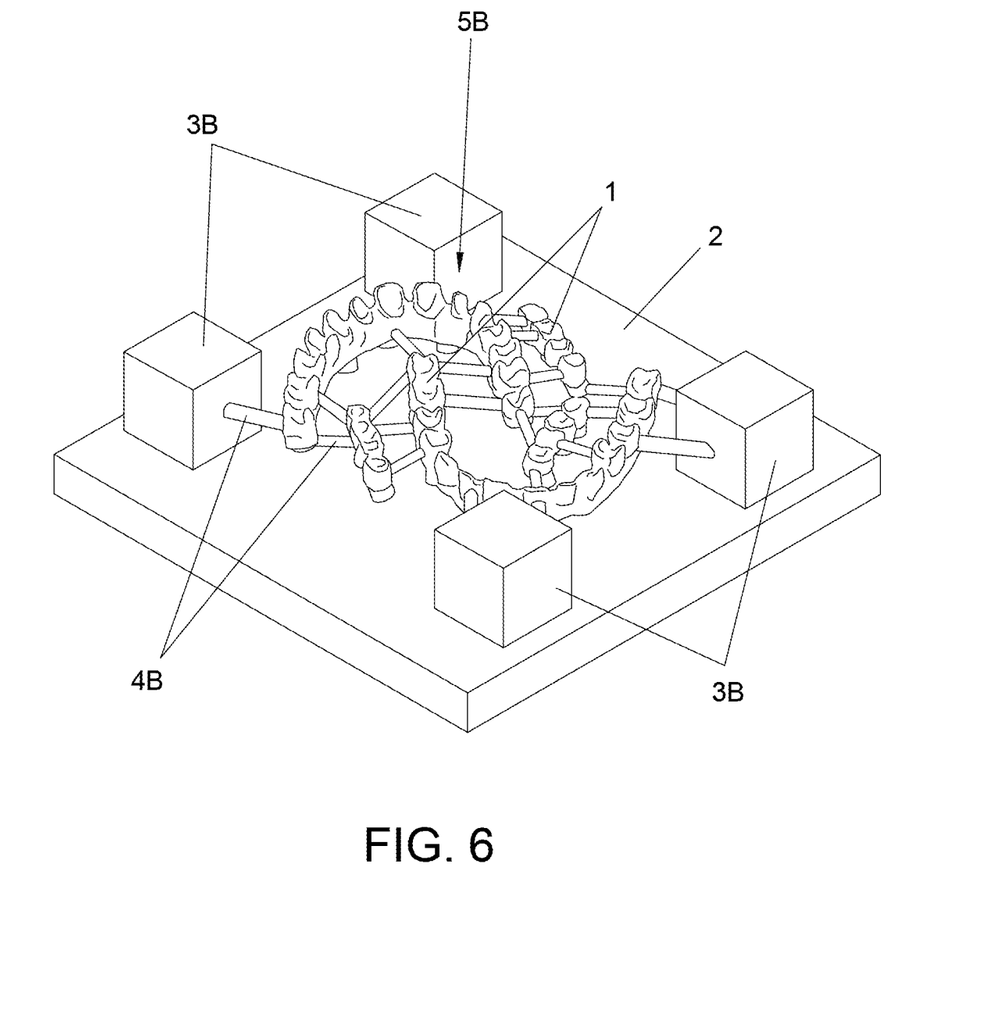
FIG. 6 shows a perspective view of a prosthetic block on a printing plate with several prostheses joined to one another by means of joining pieces and in turn joined to the positioning elements according to the second embodiment.
Figure 7:
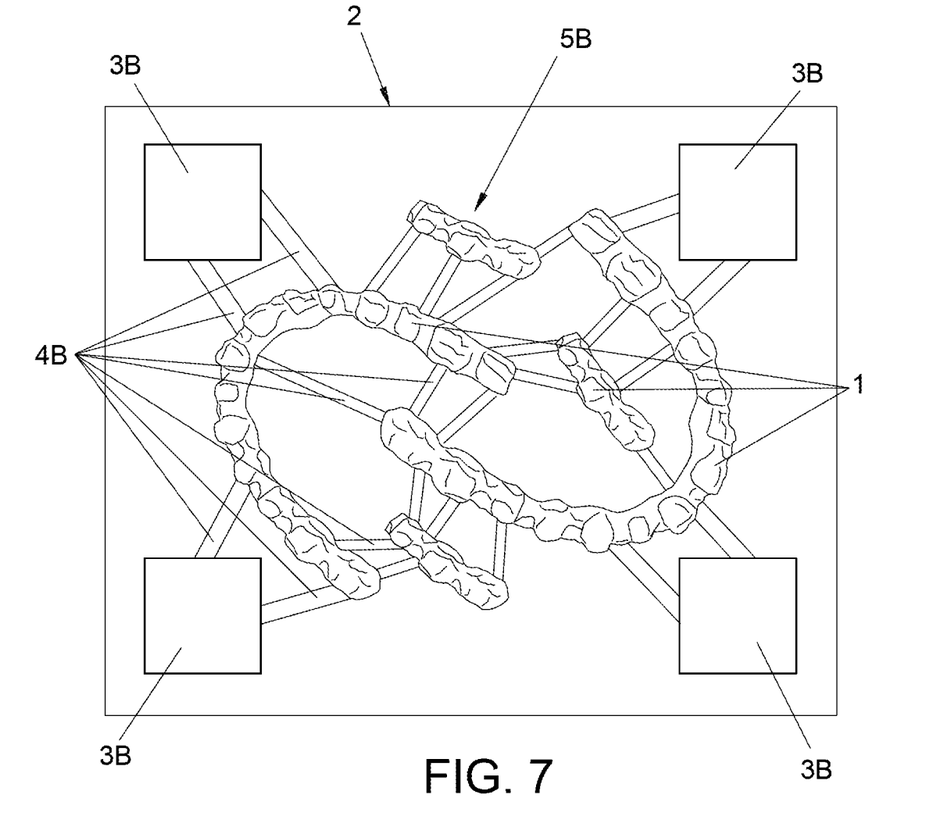
FIG. 7 shows a plan view of a prosthetic block on a printing plate with several prostheses joined to one another by means of joining pieces and in turn joined to the positioning elements according to the second embodiment of the method object of the invention.

There is a second embodiment of the method object of the invention, which also begins with a manufacturing by means of additive manufacturing technology (100) of at least two prostheses (1) joined together by means of a series of joining pieces (4B) and also joined to end positioning elements (3B), such that the prostheses (1), the joining pieces and the positioning elements (3B) form a prosthetic block (5B) which, at the end of the fixing step, is joined to the printing plate (2). By means of the positioning elements (3B), the prosthetic block (5B) adapts to the dimensions of the machining tray (8). In this second embodiment, the positioning elements (3B) are prismatic pieces which, in addition to limiting the dimensions of the prosthetic block (5B) to the machining tray (8), provide a vertical limitation for a subsequent step of the method object of the invention.

The stabilizing treatment of the material (102) is then performed, which is identical to that which is performed in the first embodiment, but on this occasion the stabilizing is performed to the prosthetic block (5B) joined to the printing plate (2) on which it was manufactured.

The next step in the second embodiment of the method object of the invention consists of performing a prior machining (107) of the prosthetic block (5B) to improve the surface and dimensional quality of the manufactured prostheses (1). To perform this prior machining (107), the prosthetic block (5B) is positioned in a machining machine by means of the printing plate (2) and the prior machining (107) of the surface of the prosthetic block (5B) opposite the printing plate (2) is carried out, and moreover, the positioning elements (3B) are machined with regard to their vertical dimension and width to adapt the dimensions of the positioning elements (3B) and guarantee the quality of an additional machining, which will be shown later in this description.

The next step in the second embodiment of the method object of the invention consists of releasing the prosthetic block (5B) from the printing plate (2) (101) on which the manufacturing was done, so that the prosthetic block releases stress.

The next step consists of performing the machining operation to the critical areas of the prosthesis (106) to provide the dimensional and surface finish characteristics to said critical areas of the prosthesis (1).

To perform the machining to the critical areas of the prosthesis (106), once the prosthetic block (5B) is released from the printing plate (2), it is necessary to perform a previous step of positioning the prosthetic block (5B) on a base plate for machining (8) (103) by means of the positioning elements (3B); the step of positioning the prosthetic block (5B) on the machining tray (103) in this embodiment comprising a substep consisting of rotating the prosthetic block (5B) 180° to position said prosthetic block (5B) on the machining tray (8) (103). After positioning the prosthetic block (5B) on the machining tray (8) (103), it is necessary to fix the prosthetic block (5B) to the machining tray (8) (104) to then perform the machining to critical areas of the prosthesis (106), which provides dimensional and surface finish characteristics to said critical areas of the prosthesis (1), which by means of additive manufacturing technology is not possible to obtain.

The two machining processes (106, 107) of the prosthesis (106) are done by eliminating the excess material with which the prosthetic block (5B) is manufactured, and can be done by milling, truing, lathing, etc.

Figure 8A:
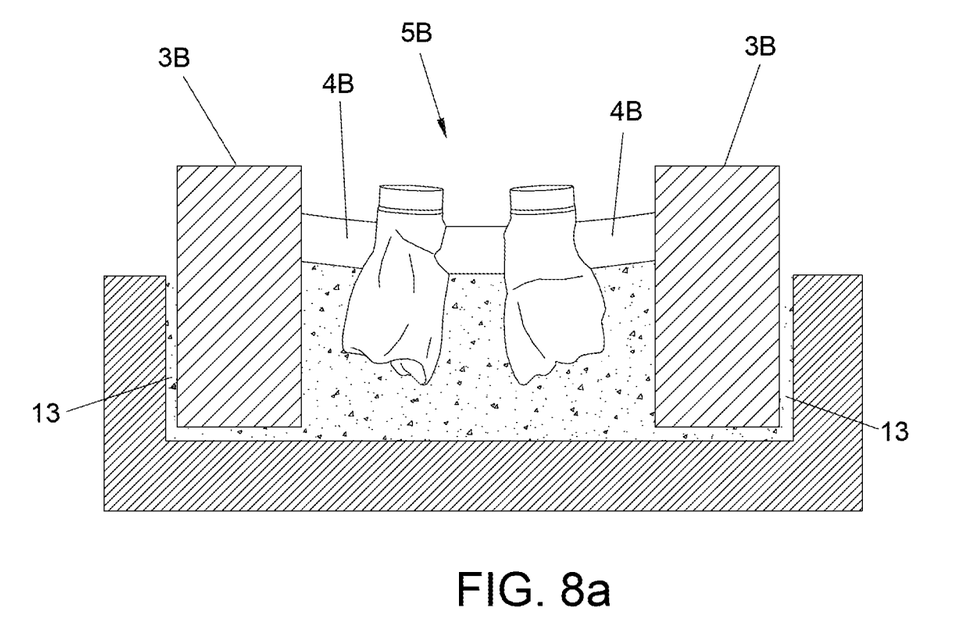
FIG. 8a shows a side view of the way in which the positioning elements are fixed to the machining tray according to a first way of fixing them in the second embodiment of the method object of the invention.
Figure 8B:
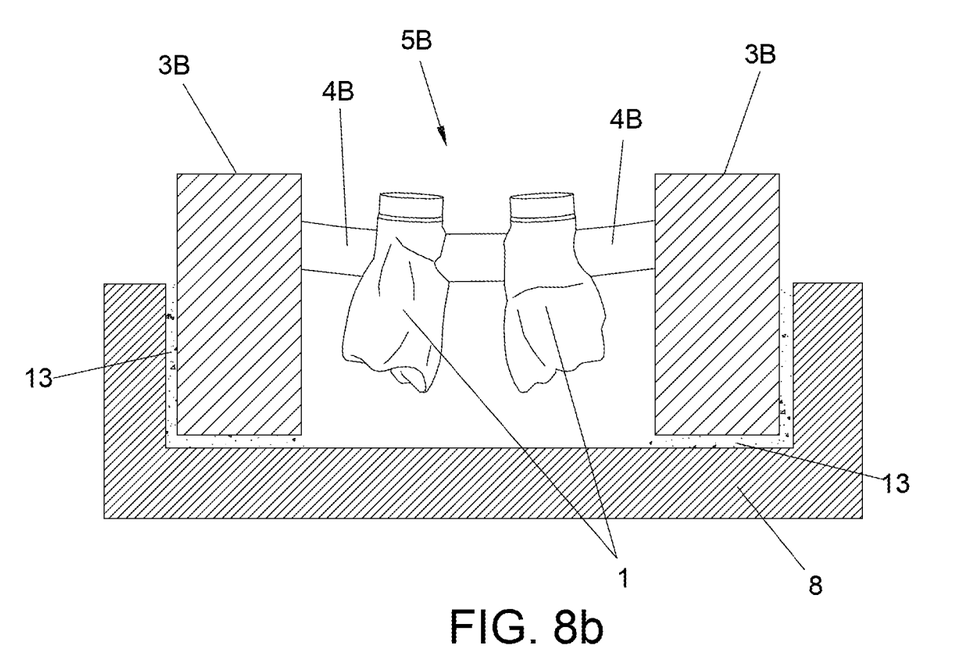
FIG. 8b shows a side view of the way in which the positioning elements are fixed to the machining tray according to a second way of fixing them in the second embodiment of the method object of the invention.

When fixing the prosthetic block (5B) to the machining tray (104) for machining the critical areas of the prosthesis (106), two ways may be used:
 a first way wherein the entire volume of the prosthetic block (5B) can be fixed to the machining tray (8), for which an adhesive product (13) is poured on the machining tray (8) until reaching a level such that a compact block is created (see FIG. 8a);
 a second way, wherein only the positioning elements (3B) are fixed to the machining tray (8) by an adhesive product (13), exclusively situated between the positioning elements (3B) and the machining tray (8) (see FIG. 8b).

To perform the machining to the critical areas of the prosthesis (106), once the prosthetic block (5B) has been fixed to the machining tray (8), it is necessary to fix the machining tray (8) to the machining machine (105), which is done by conventional elements.

In the second embodiment of the method object of the invention, the positioning elements (3B), which are manufactured together with the prosthesis (1), are used as end reference elements in the machining machine for the two machining operations (106, 107), which are performed on the prosthesis (1). Since the prosthesis (1) is manufactured together with the positioning elements (3B) that mark the reference for the machining machine, the machining machine performs the two machining operations (106, 107) of the prosthesis (1) without the possibility of error, since the positions in which the machining operations (106, 107) must be performed on the prosthesis (1) are obtained by referring to the positioning elements (3B) which, by being manufactured together with the prosthesis (1), have specific and known distances and positions for the machining machine.

The present invention should not be taken to be limited to the embodiment herein described. Other arrangements may be carried out by those skilled in the art based on the present description. Accordingly, the scope of the invention is defined by the following claims.

The invention claimed is:

1. A method for manufacturing and machining dental, maxillofacial and trauma prostheses, comprising:
 manufacturing, with excess material and additive manufacturing technology on a printing plate, a prosthetic block that comprises at least a prosthesis, a plurality of joining pieces and at least a positioning element, with specific dimensions and distances between the prostheses, the joining pieces and the positioning elements;
 positioning the prosthetic block on a machining tray by using positioning elements;
 fixing the prosthetic block to the machining tray using at least the positioning elements, such that the prosthesis is fixed in a specific and known position on the machining tray, thanks to the specific distances and dimensions of the prosthetic block;
 fixing the machining tray to a machining machine,
 performing a machining operation to critical areas of the prosthesis to provide dimensional and surface finish characteristics to the critical areas of the prosthesis,
 wherein, for the step of fixing the prosthetic block to the machining tray, an adhesive product is situated only between the positioning elements and the machining tray, fixing only the positioning elements to the machining tray.

2. The method for manufacturing and machining dental, maxillofacial and trauma prostheses according to claim 1, wherein after manufacturing and before positioning the prosthetic block on a machining tray, the method comprises the additional steps of:
 releasing the prosthetic block from the printing plate, and applying a stabilizing treatment to the material.

3. The method for manufacturing and machining dental, maxillofacial and trauma prostheses according to claim 2, wherein the stabilizing treatment of the material is a treatment selected from:
 thermal treatment,
 polymer curing, and
 ceramic sintering.

4. The method for manufacturing and machining dental, maxillofacial and trauma prostheses according to claim 3, wherein the thermal treatment comprises applying heat or cold for metals, or alternating heat and cold.

5. The method for manufacturing and machining dental, maxillofacial and trauma prostheses according to claim 4, wherein the thermal treatment comprises applying heat in a temperature range greater than 700 degrees centigrade.

6. The method for manufacturing and machining dental, maxillofacial and trauma prostheses according to claim 4, wherein the thermal treatment comprises applying cold in a temperature range lower than zero centigrade.

7. The method for manufacturing and machining dental, maxillofacial and trauma prostheses according to claim 4, wherein the thermal treatment alternating between heat and cold is in a temperature range between −250 degrees centigrade and +1,000 degrees centigrade.

8. The method for manufacturing and machining dental, maxillofacial and trauma prostheses according to claim 3, wherein the polymer curing comprises thermal curing, chemical curing, or light curing.

9. The method for manufacturing and machining dental, maxillofacial and trauma prostheses according to claim 1, wherein after manufacturing, the method comprises the steps of:
- applying a stabilizing treatment to the material,
- performing a prior machining to the surface of the prosthetic block to improve the dimensional and surface finish characteristics of the manufactured prostheses, and likewise, machining the positioning elements with regard to their vertical dimension and width, and
- releasing the prosthetic block from the printing plate, wherein, the step of positioning the prosthetic block on the machining tray using the positioning elements comprises a substep involving rotating the prosthetic block 180° to position the prosthetic block on the machining tray.

10. The method for manufacturing and machining dental, maxillofacial and trauma prostheses according to claim 1, wherein the excess material is quantified between 5 and 1000 microns.

11. The method for manufacturing and machining dental, maxillofacial and trauma prostheses according to claim 1, wherein:
- the positioning elements comprise a cylindrical body and a conical-shaped end,
- the machining tray comprises a plurality of recesses located on vertices of a grid distributed on the machining tray which provide a series of references for the machining machine,
- such that the ends are positioned in the recesses so that the positioning of the prosthesis in the machining machine is done with complete precision.

12. The method for manufacturing and machining dental, maxillofacial and trauma prostheses according to claim 1, wherein the positioning elements are prismatic pieces that limit the dimensions of the prosthetic block to the machining tray.

* * * * *